(12) United States Patent
Schutz et al.

(10) Patent No.: US 9,732,902 B2
(45) Date of Patent: Aug. 15, 2017

(54) STAND BASE FOR MICROSCOPES

(71) Applicant: Leica Microsystems (Schweiz) AG, Heerbrugg (CH)

(72) Inventors: Marco Schutz, Rorschach (CH); Ralf Körber, Zürich (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 156 days.

(21) Appl. No.: 14/660,981

(22) Filed: Mar. 18, 2015

(65) Prior Publication Data

US 2015/0267860 A1 Sep. 24, 2015

(30) Foreign Application Priority Data

Mar. 19, 2014 (DE) .................... 10 2014 103 745

(51) Int. Cl.
| | |
|---|---|
| *B60B 33/00* | (2006.01) |
| *F16M 11/42* | (2006.01) |
| *B60T 1/14* | (2006.01) |
| *B60T 3/00* | (2006.01) |

(52) U.S. Cl.
CPC ......... *F16M 11/42* (2013.01); *B60B 33/0078* (2013.01); *B60B 33/0089* (2013.01); *B60T 1/14* (2013.01); *B60T 3/00* (2013.01); *B60B 33/0042* (2013.01)

(58) Field of Classification Search
CPC ... B60B 33/0042; B60B 33/0089; B60T 1/14; B60T 3/00; F16M 11/42
USPC ...... 248/129, 188.8, 188.9, 676, 677, 188.2, 248/424, 678; 280/42
See application file for complete search history.

(56) References Cited

U.S. PATENT DOCUMENTS

| | | | | |
|---|---|---|---|---|
| 2,537,909 | A * | 1/1951 | Puddester ................ | A61G 5/00 188/2 F |
| 5,035,445 | A * | 7/1991 | Poulin ...................... | B60S 9/06 188/5 |
| 5,687,984 | A * | 11/1997 | Samuel ................... | B62B 3/008 280/42 |
| 6,247,673 | B1 | 6/2001 | Bees | |
| 6,305,659 | B1 | 10/2001 | Metelski | |
| 7,886,380 | B2 * | 2/2011 | Hornbach ............ | A47C 19/045 5/613 |
| 8,083,191 | B2 * | 12/2011 | Lai ....................... | H05K 5/0234 248/188.2 |
| 2015/0267860 | A1 * | 9/2015 | Schutz ..................... | B60T 3/00 248/424 |

FOREIGN PATENT DOCUMENTS

| | | |
|---|---|---|
| DE | 17 16 103 U | 2/1956 |
| DE | 199 52 477 A1 | 5/2001 |
| DE | 10 2005 003 082 A1 | 7/2006 |
| DE | 20 2012 007 320 U1 | 10/2012 |

* cited by examiner

*Primary Examiner* — Tan Le
(74) *Attorney, Agent, or Firm* — Hodgson Russ LLP

(57) ABSTRACT

The invention relates to a stand base (10) for microscopes, which encompasses a stand base body (12) on which multiple rollers (14 to 20) for displacing the stand base (10) are fastened. The stand base (10) furthermore has a braking system (40) to prevent displacement of the stand base (10), the braking system encompassing at least two braking feet (44, 46).

17 Claims, 5 Drawing Sheets

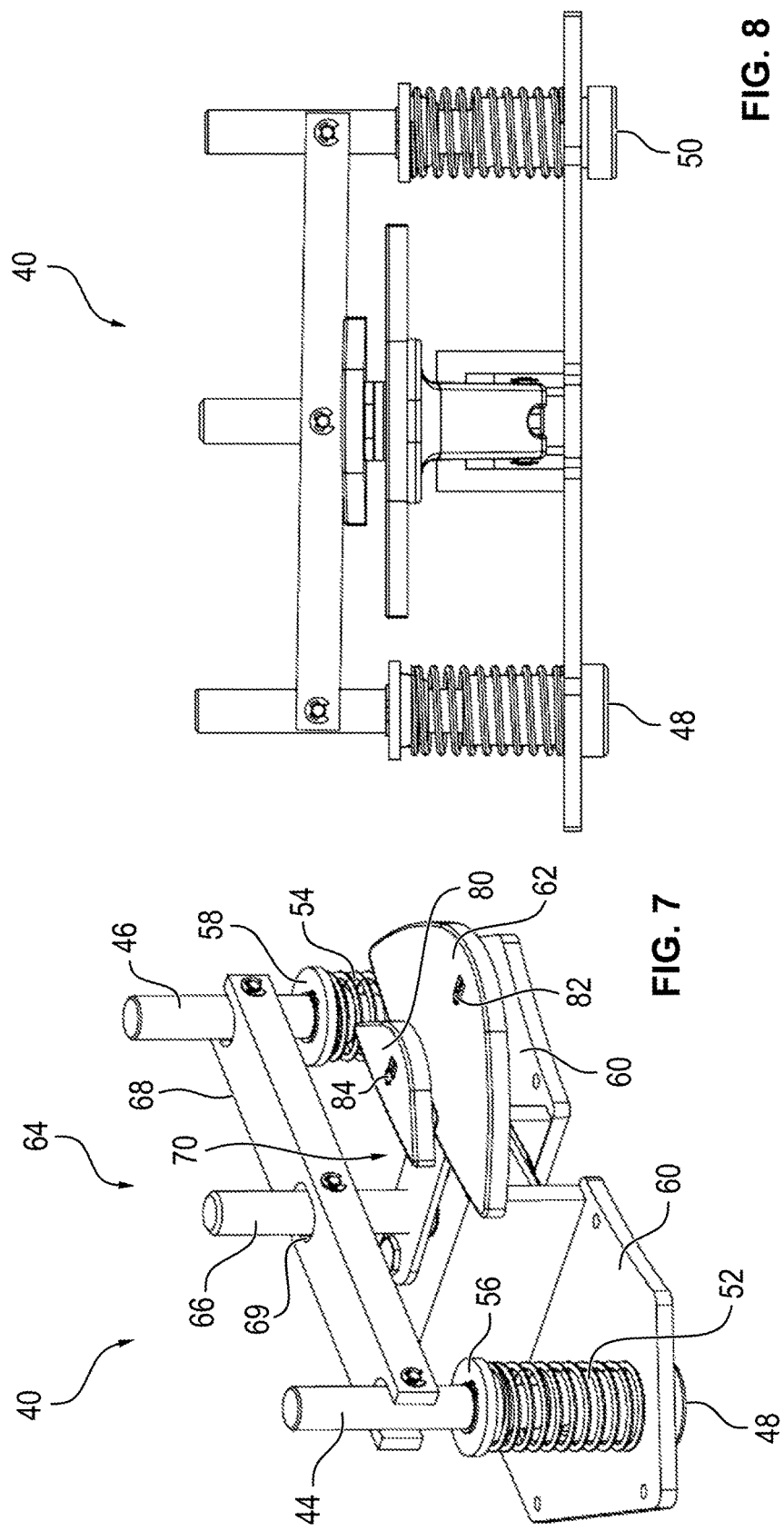

STAND BASE FOR MICROSCOPES

CROSS REFERENCE TO RELATED APPLICATIONS

This application claims priority of German patent application number 10 2014 103 745.6 filed Mar. 19, 2014, the entire disclosure of which is incorporated by reference herein.

FIELD OF THE INVENTION

The invention relates to a stand base for microscopes, in particular surgical microscopes, which encompasses a stand base body on which multiple rollers are fastened for displaceably supporting the stand base on the floor. The stand base furthermore has a braking system to prevent displacement of the stand base, said braking system encompassing at least two braking feet that, in a braking position, press against the floor and thereby prevent or at least impede a displacement of the stand base and, in a released position, enable a displacement of the stand base.

BACKGROUND OF THE INVENTION

Surgical microscopes as a rule are very heavy, for which reason their stands comprise rollers so that the surgical microscopes can easily be displaced from one position to another with no need to lift them. Conversely, however, it is necessary for the surgical microscopes not to be unintentionally moved during the surgical procedure, since the success of the procedure can thereby be jeopardized. The stand bases have, for this purpose, braking systems by which the stand bases and thus the surgical microscopes can be immobilized.

A further problem that occurs with stands for surgical microscopes is that their weight and/or center of gravity change depending on position and population with additional components. In addition, surgical microscopes usually have very long-reach arms. The consequence of this is that the stand bases must be very heavy in order to prevent the surgical microscope from tipping over.

The heavy weight of the stand bases is also disadvantageous, however, since they may need to be carried when delivered, which can be ergonomically very unfavorable.

The document EP 1 026 531 B1 discloses a stand base for microscopes in which different additional weights can be selectably received in the stand base body. This has the advantage that the individual components can be individually carried upon delivery, but that secure and stable positioning is ensured thanks to the total weight achieved by reception of the additional weights. With this stand base, the additional weights are placed on a plate that is then connected to the actual stand base body via a threaded rod. It is disadvantageous in this context that this installation is quite laborious.

The stand base of the document EP 1 026 531 B1 furthermore comprises four brake blocks, each of which has associated with it an actuation element that, upon actuation, ensures that the individual brake blocks come into contact with the floor and thus enable immobilization of the stand base and prevent unintentional displacement. This braking system is disadvantageous in that for secure fastening, multiple pedals must be stepped on.

A further stand base for microscopes is known from the document EP 0 922 181 B1.

SUMMARY AND ADVANTAGES OF THE INVENTION

The object of the invention is to describe a stand base for microscopes with which secure positioning of the microscopes can be achieved in simple fashion.

This object is achieved by a stand base having the features and advantageous refinements described herein.

According to the present invention, the braking system encompasses an actuation element, actuatable by an operator, for shifting the braking feet from the released position into the braking position, said actuation element being coupled to both braking feet in such a way that upon actuation of the actuation element, both braking feet are moved from the released position into the braking position.

What is achieved thereby is that only a single actuation element needs to be actuated for secure braking of the stand base and thus for secure immobilization of the stand base. Particularly simple operating convenience is thereby achieved. This also eliminates the possibility, as in the case of stand bases having multiple individual braking feet requiring actuation, of forgetting to actuate all the braking feet. The risk then exists, in particular, that only one braking foot is in contact with the floor, and rotation of the stand base in place is thus not prevented.

The stand base comprises in particular a receiving unit, in which the stand on which the actual microscope, in particular a surgical microscope, is fastened, can be received.

The stand body in particular forms a kind of housing, which protects the other components of the stand base at least from above, and on which all further components are mounted.

The actuation element is in particular a pedal, so that the operator can easily actuate the actuation element with his or her foot and thereby on the one hand can brake the stand base in ergonomically favorable fashion and on the other hand can exert a great deal of force without difficulty It is additionally advantageous if the actuation element is connected via a bar system to the two braking feet. This bar system encompasses in particular a transverse bar as well as a tie bar, the two braking feet being respectively articulatedly fastened at the two ends of the transverse bar. The tie bar in turn is articulatedly connected to the transverse bar and furthermore coupled to the actuation element in such a way that said tie bar is moved in a predetermined direction upon an actuation of the actuation element, the tie bar in turn entraining, by its own motion, the transverse bar that then in turn moves the braking feet from their released position into the braking position, i.e. toward the floor, so that they contact the floor and thus bring about the desired immobilization of the stand base on the floor.

Actuation of both braking feet using only one actuation element can be implemented in a particularly simple, entirely mechanical manner by way of such a bar system. In particular, a bar system of this kind has little fault susceptibility, so that a long service life is achieved.

The two braking feet in particular are mounted, and are connected to one another and to the actuation element, in such a way that the arrangement of the two braking feet relative to one another upon braking is modifiable. In particular, the two braking feet are displaceable along two axes extending parallel to one another, those ends of the braking feet which are intended for floor contact being arranged at the same height in the released position but being capable of being shifted upon braking, by way of the mutually modifiable arrangement, different distances along the respective axis from said released position.

What is achieved thereby is that floor irregularities can be compensated for. The braking feet can assume different positions, but the contact pressure with which the braking feet are pressed against the floor remains the same.

A secure immobilization effect is thus always achieved with the braking system, even on uneven floors.

This modifiable position of the two braking feet relative to one another is achieved in particular by the fact that they are fastened articulatedly on the transverse bar, and the transverse bar is in turn fastened articulatedly on the tie bar, so that the position of the braking feet relative to one another is modified thanks to a corresponding non-horizontal arrangement of the transverse bar. In particular, the two mounting points at which the braking feet are mounted on the transverse bar comprise predetermined enlargements that enable a corresponding clearance.

It is furthermore advantageous if the two braking feet are each preloaded in the released position with the aid of an elastic element, and upon actuation of the actuation element are moved, against a return force of said elastic element, from the released position into the braking position. The elastic element involves, in particular, compression springs.

It is furthermore advantageous if an immobilization device is provided which holds the braking feet in the braking position after actuation of the actuation element. What is achieved thereby is that continuous actuation of the actuation element is not required for long-term immobilization of the stand base.

The immobilization device can comprise in particular a guide that, for immobilization of the braking feet, interacts in wedging fashion with the tie bar of the braking unit and thus prevents the tie bar from moving back into an initial position, i.e. into that position in which it is arranged when the braking feet are arranged in the released position. In particular, a spring packet is provided with which the guidance unit interacts in wedging fashion with the tie bar.

The braking system comprises in particular a further actuation element with the aid of which the immobilization unit can be released again. Actuation of this further actuation element in particular causes the wedging interaction of the guide with the tie bar to be released, so that because of the return force of the elastic elements, the braking feet are moved back into their initial position, i.e. from the braking position back into the released position.

The further actuation element is in particular likewise a pedal; when the stand base is oriented as intended, said pedal and the pedal for actuating the braking system are arranged in particular immediately above one another, the pedal for releasing the immobilization unit being shorter than the pedal for actuating the braking unit. What is achieved thereby is that the two pedals can be actuated, in ergonomically favorable fashion, from the same location, but the two pedals nevertheless can easily be reached.

A symbol by which the function performed by the pedals is symbolized is preferably imaged onto each of the two pedals. In particular, a closed padlock is shown on the pedal for actuating the braking unit, and a padlock having an open shackle is shown on the pedal for releasing the immobilization unit.

In a particularly preferred embodiment, the base body comprises multiple chambers in each of which at least one additional weight can selectably be received in order to balance the stand. Reception of additional weights makes it possible to increase the weight of the stand base in simple fashion.

The stand body is, in particular, of very largely hollow configuration and is preferably relatively light in weight, so that it can easily be transported to the utilization site prior to assembly. A heavy weight can nevertheless be achieved by filling the chambers with the additional weights.

The braking system is embodied in particular as a single module that is shaped in such a way that it can be received in one of said chambers. A particularly simple configuration of the stand base, and particularly simple installation, are thereby achieved. The outer housing of the braking system therefore corresponds approximately to the shape of one of the chambers of the stand base body.

The above-described braking feet, the actuation elements, the bar system, and/or the immobilization device are, in particular, parts of the braking system module.

In a particularly preferred embodiment the stand base body encompasses four identically shaped chambers, into each of which two identically shaped additional weights can selectably be received. The braking system is in particular twice the size of an additional weight, so that the braking system completely fills up one of the chambers.

In an alternative embodiment, more or fewer than four chambers can also be provided. The chambers furthermore can also be embodied in such a way that only one additional weight, or also more than two additional weights, for example three or four additional weights, can respectively be received in them.

At least one fastening means with which the additional weights can be fastened directly on the stand base body is preferably provided in each of the chambers. In particular, the additional weights can be bolted directly onto the stand base body inside the chambers, for which purpose a bolt is passed through a hole of the additional weights and engages into a correspondingly complementarily embodied thread of the stand base body.

What is achieved thereby is that further complex means for holding the additional weights are not necessary. In addition, there is no need for a plate on which all the additional weights must be placed before being connected to the stand base body. Installation is thereby appreciably simplified.

It is furthermore advantageous if the rollers of the stand base are embodied as double rollers. Simple movement with minimum energy expenditure is thereby achieved.

The stand base comprises, in particular, four rollers that are arranged symmetrically with respect to one another.

It is moreover advantageous if the stand base is embodied in such a way that different stands can be fastened to it, so that it is universally usable. A standardized interface for fastening stands to the stand base is provided, in particular, for this purpose.

BRIEF DESCRIPTION OF THE DRAWING VIEWS

Further features and advantages of the invention are evident from the description below, which explains the invention in further detail with reference to exemplifying embodiments in conjunction with the attached drawings, in which:

FIG. 7 is a schematic perspective depiction of a braking system of the stand base according to FIGS. 1 to 5;

FIG. 8 is a further schematic depiction of the braking system according to FIG. 7.

DETAILED DESCRIPTION OF THE INVENTION

Figure 2:
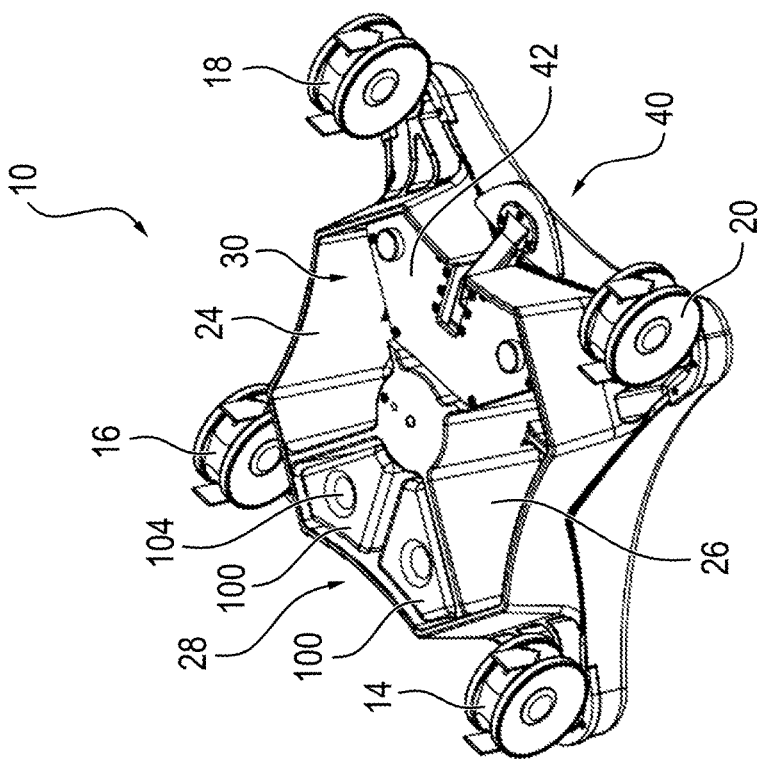
FIG. 2 is a further schematic perspective depiction of the stand base of FIG. 1, looking toward the underside.
Figure 1:
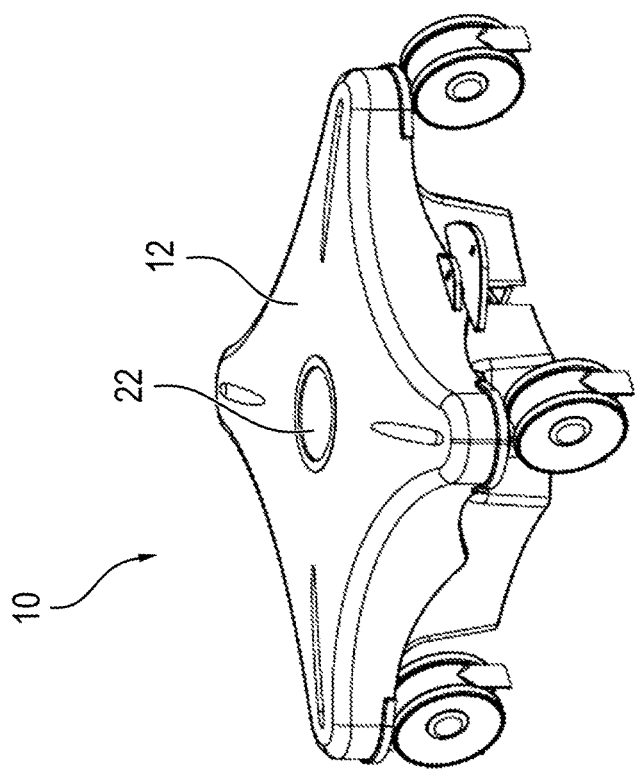
FIG. 1 is a schematic perspective depiction of a stand base.
Figure 3:
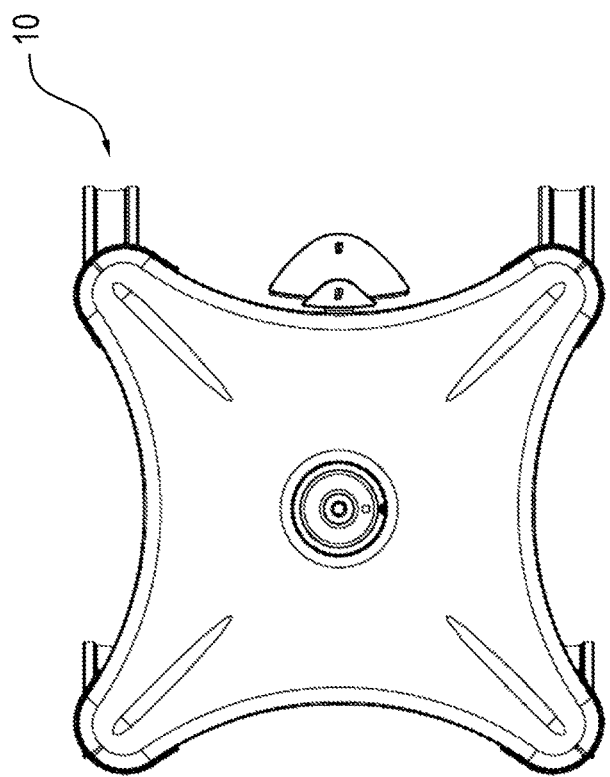
FIG. 3 is a top view of the stand base according to FIGS. 1 and 2.
Figure 4:
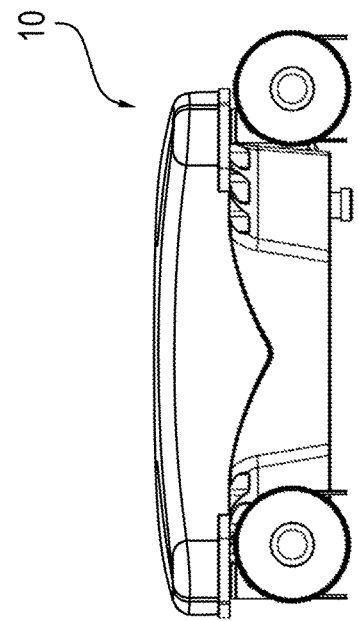
FIG. 4 is a side view of the stand base according to FIGS. 1 to 3.
Figure 5:
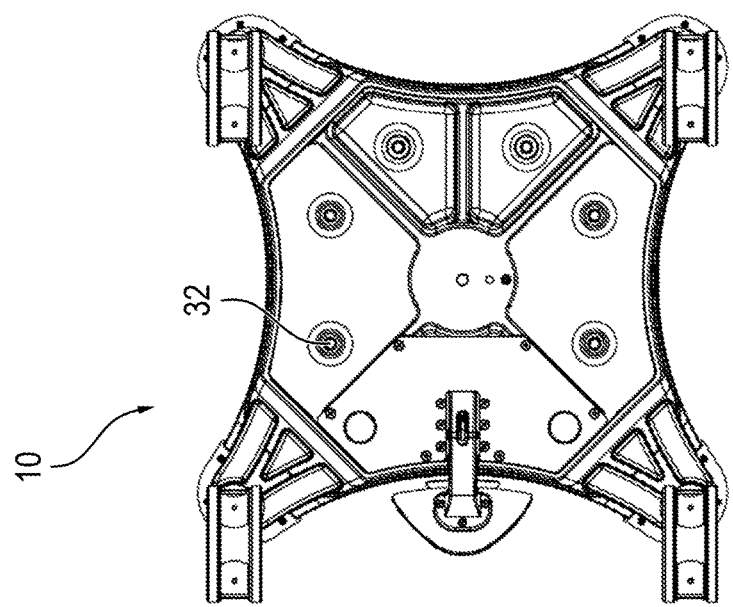
FIG. 5 is a view from below of the stand base according to FIGS. 1 to 4.

FIG. 1 is a schematic perspective depiction of a stand base 10, looking toward its upper side. FIG. 2 is a further schematic depiction of said stand base 10, the view here being directed toward the underside. FIG. 3 is a top view, FIG. 4 a side view, and FIG. 5 a bottom view of the stand base according to FIGS. 1 and 2.

Stand base 10 encompasses a stand base body 12 on which are mounted four rollers 14 to 20 by which stand base 10 is mounted displaceably on the floor. In the exemplifying embodiment shown, rollers 14 to 20 are double rollers that enable particularly simple displacement with little energy expenditure. In an alternative embodiment, single rollers can also be used. Stand base 10 can also comprise fewer than four rollers 14 to 20, for example three rollers 14 to 20, or more than four rollers 14 to 20, for example five rollers 14 to 20.

Provided on the upper side of stand base body 12 is a receiving opening 22 into which a vertically extending support member of a stand can be introduced so that the actual stand is fastened on stand base 10. The stand is in particular a stand for microscopes, preferably surgical microscopes. Because such stands as a rule have a long working radius and are heavy, stand base 10 must also be correspondingly heavy in order to ensure secure positioning; this is achieved, as will be explained more precisely below, by the fact that additional weights 100 can be fastened onto stand base body 12, which itself is relatively light in weight so that it can easily be carried.

Four chambers 24 to 30, into each of which two additional weights 100 can selectably be received, are embodied on the underside of stand base body 12. In an alternative embodiment of the invention, more than four chambers 24 to 30 or fewer than four chambers 24 to 30 can also be provided. In addition, chambers 24 to 30 can also be embodied in such a way that only one additional weight 100, or also more than two additional weights 100, can be received in each of them.

Additional weights 100 are in particular all identically shaped, so that they can be exchanged arbitrarily.

In the exemplifying embodiment shown in FIGS. 1 to 5, two additional weights 100 are received only in a single chamber, namely in chamber 28, while the other chambers 24, 26 are unpopulated. Further additional weights 100 can also be received in these chambers 24, 26 as necessary.

Figure 6:
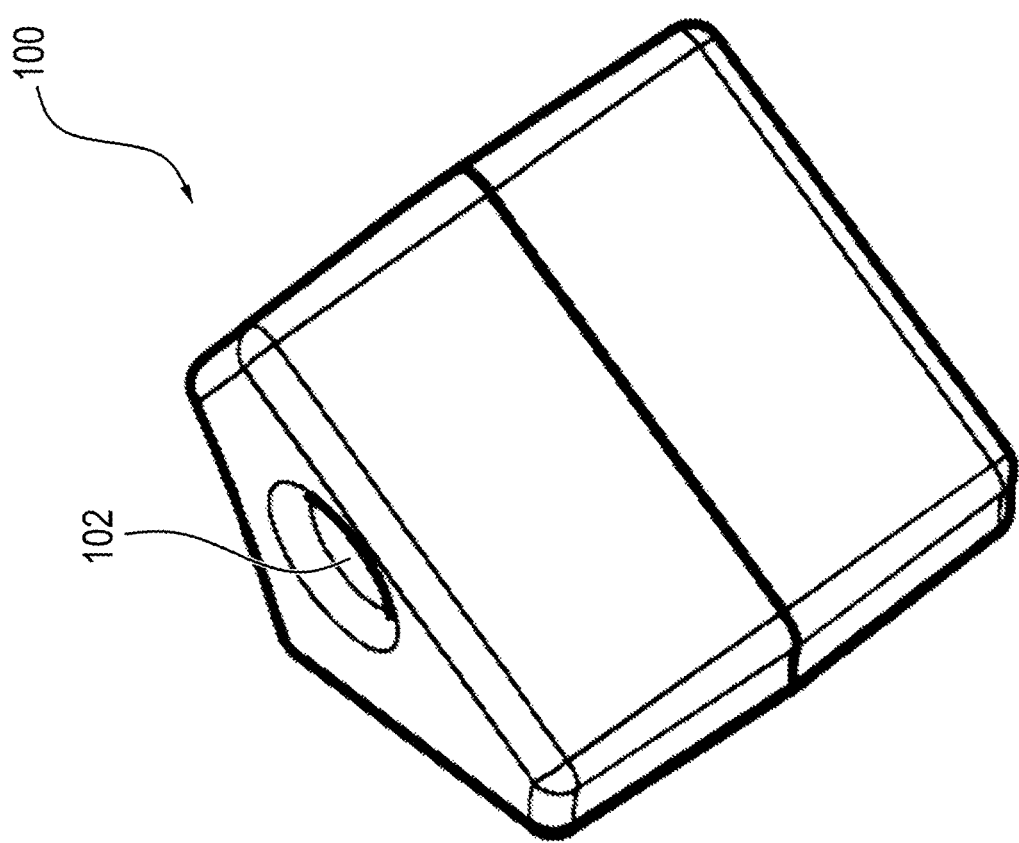
FIG. 6 is a schematic perspective depiction of an additional weight.

FIG. 6 is a schematic perspective depiction of an additional weight 100 of this kind. Additional weight 100 has a through opening 102 through which a bolt 104 can be passed.

Threads, one of which is labeled by way of example with the reference character 32, are provided at corresponding locations in chambers 24 to 30. Additional weights 100 can thus be bolted in simple fashion, via bolts 104, directly onto stand base body 12, so that particularly simple fastening and removal of additional weights 100 is possible, and the weight of stand base 10 can always be easily adapted to individual circumstances. Separate handling of the individual additional weights 100 nevertheless allows additional weights 100 and stand base 10 to be easily carried to their intended utilization site.

Received in one of chambers 24 to 30 is a braking system 40 with the aid of which stand base 10 can be braked and immobilized so that unintended displacement of stand base 10 is prevented. A particularly simple configuration and particularly simple installation are achieved thanks to reception of said braking system 40 in one of chambers 24 to 30.

In the exemplifying embodiment shown, braking system 40 is embodied to be approximately the same size as two additional weights 100. In an alternative embodiment of the invention, braking system 40 can also be embodied to be only sufficiently large to have the shape of one of additional weights 100, and thus to occupy only half of a chamber 24 to 30.

Braking system 40 comprises in particular a housing 42 by which the internal components of braking system 40 are protected. The external shape of said housing 42 corresponds approximately to the shape of one of chambers 24 to 30, and thus approximately to the shape of two additional weights 100.

FIG. 7 is a schematic perspective depiction of braking system 40, housing 42 having been omitted for better visibility of the internally located components. FIG. 8 is a side view of braking system 40.

Braking system 40 comprises two braking feet 44, 46 that have contact surfaces 48, 50 by way of which contact with the floor can be established, and by way of which the friction necessary for immobilizing stand base 10 is applied.

Braking feet 44, 46 are movable between a released position and a braking position; in the braking position, braking feet 44, 46 are in contact with the floor and thus prevent or at least impede movement of stand base 10 as a result of the corresponding frictional force. In the released position, conversely, braking feet 44, 46 are arranged in such a way that they do not contact the floor and, in particular, abut against housing 42 or are recessed thereinto.

Braking system 40 furthermore comprises two springs 52, 54 by way of which braking feet 44, 46 are preloaded in the released position, by the fact that springs 52, 54 rest on the one hand against shoulders 56, 58 of braking feet 44, 46, and against the stationary basic structure 60 of braking system 40.

Upon shifting of braking feet 44, 46 from the released position into the set position, springs 52, 54 become compressed so that they exert a return force toward of the released position.

Braking system 40 furthermore comprises an actuation element, embodied as a brake pedal 62, upon actuation of which the two braking feet 44, 46 are moved from the released position into the braking position. This has the advantage that only a single actuation element 62 needs to be actuated in order to brake, and in particular immobilize, stand base 10. Particularly simple handling is thereby achieved, and the possibility of forgetting to set multiple brakes is eliminated.

Brake pedal 62 is connected via a bar system 64 to the two braking feet 44, 46, said bar system 64 comprising a tie bar 66 and a transverse bar 68. Tie bar 66 is connected to brake pedal 62 in such a way that it is moved in a vertical direction upon actuation of brake pedal 62.

Transverse bar 68 is arranged articulatedly on tie bar 66, tie bar 66 in particular being arranged centeredly in transverse bar 68 and being guided through an opening 69 that allows a clearance at least in the direction of the two ends of transverse bar 68, so that transverse bar 68 can tilt relative to tie bar 66.

The two braking feet 44, 46 are respectively arranged, likewise articulatedly, at the two ends of transverse bar 68, the two feet 44, 46 being received in recesses which are shaped in such a way that they likewise permit a rotation of transverse bar 68 relative to braking feet 44, 46. The mounting of tie bar 66 and of braking feet 44, 46 is embodied in particular so that they are each movable only along vertical axes.

The result of the articulated connection via the transverse bar is that with respect to their initial position, i.e. the released position in which transverse bar 68 is arranged horizontally and the two braking feet 44, 46 project the same distance out of stand base 10, the two braking feet 44, 46 can be moved different distances downward as a result of a tilting of transverse bar 64, as shown e.g. in FIG. 8. In the case shown in FIG. 8, braking foot 46 is moved farther downward than braking foot 44. What is achieved thereby is that any floor irregularities that may be present can be compensated for, but that even in a context of such floor irregularities both braking feet 44, 46 nevertheless rest securely on the floor so that reliable braking of stand base 10 is achieved. In particular, the same contact pressure can thus be applied even in a context of irregularities. Braking system 40 is embodied in particular in such a way that floor irregularities of up to 3 mm can be compensated for.

Braking system 40 furthermore comprises an immobilization device 70 with which the feet are held in the braking position after actuation of brake pedal 62.

Figure 9:
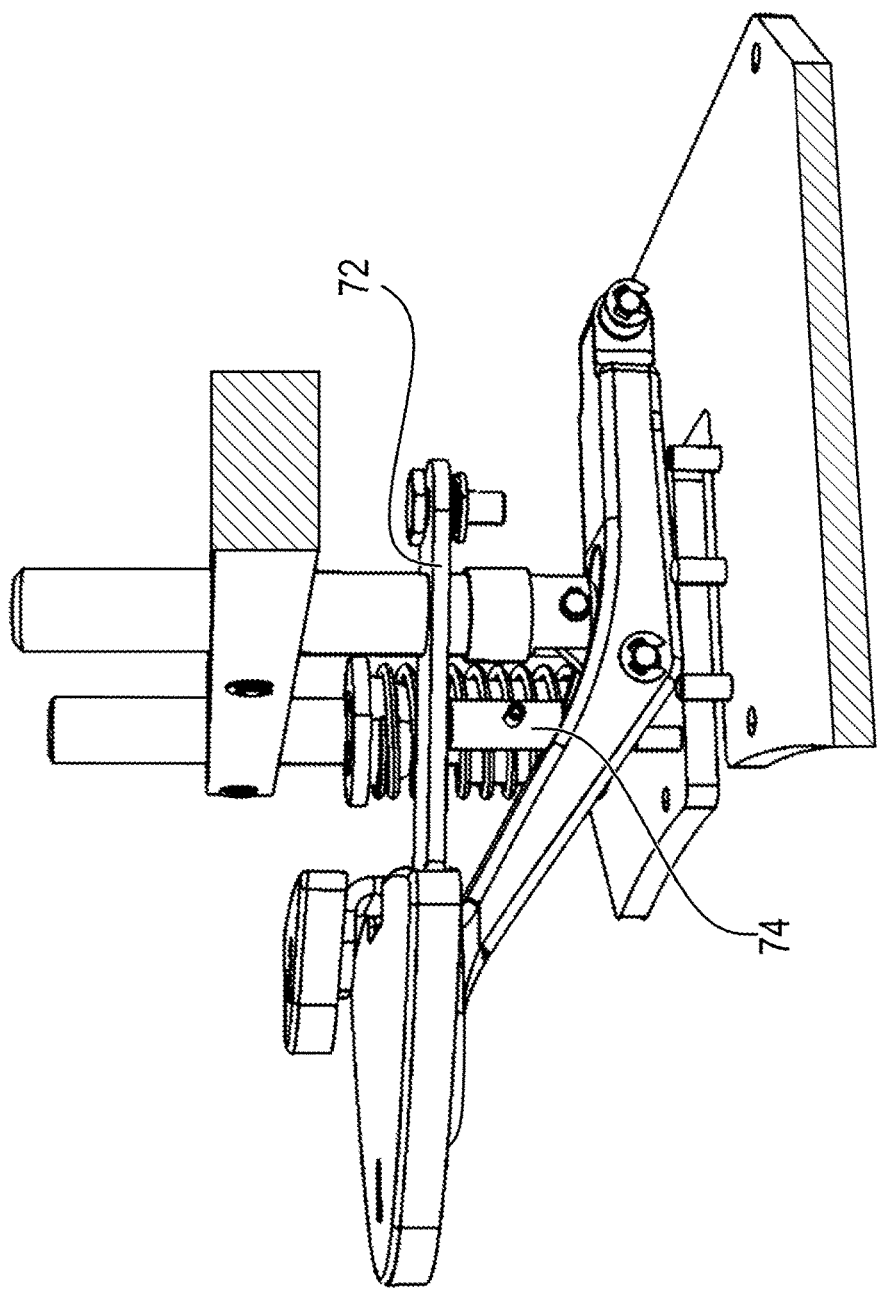
FIG. 9 shows a portion of the braking system according to FIGS. 7 and 8.

FIG. 9 shows a portion of braking system 40 in which the configuration of immobilization unit 70 is shown. Immobilization unit 70 comprises a guidance unit 72 that has a hole through which tie bar 66 passes. Guidance unit 72 is held, by way of a spring 74, in a position in which it interacts in wedging fashion relative to tie bar 66, so that a movement of tie bar 66 is possible only with a great deal of force.

Also provided is a further pedal 80 with the aid of which immobilization device 70 can be released again so that braking feet 44, 46 are moved back, because of the return force of springs 52, 54, into their initial position, i.e. the released position. Upon actuation of this pedal 80, guidance unit 72 is moved downward against the force of spring 74, with the result that the wedging interaction of tie bar 66 is released and the latter can continue to move.

Pedal 80 is arranged above brake pedal 62 and is shorter than said brake pedal 62, so that the two pedals can be actuated in simple and ergonomically favorable fashion but unintentional actuation of the wrong pedal is nevertheless avoided.

In addition, in order to avoid confusion, symbols 82, 84 are provided on pedals 62, 80; in particular, a closed padlock 82 is depicted on brake pedal 63 and a padlock 84 having an open shackle is depicted on pedal 80.

PARTS LIST

10 Stand base
12 Stand base body
14 to 20 Rollers
22 Receiving opening
24 to 30 Chambers
32 Thread
40 Braking unit
42 Housing
44, 46 Braking foot
48, 50 Contact surface
52, 54 Spring
56, 58 Shoulder
60 Basic structure
62 Brake pedal
64 Bar system
66 Tie bar
68 Transverse bar
69 Opening
70 Immobilization device
72 Guidance unit
74 Spring
80 Pedal
82, 84 Symbol
100 Additional weight
102 Through opening
104 Bolt

What is claimed is:

1. A stand base for a surgical microscope stand, the stand base comprising:
a stand base body,
multiple rollers, fastened on the stand base body, for displaceably supporting the stand base on a floor, and
a braking system to prevent displacement of the stand base,
the braking system including at least two braking feet that, in a braking position, press against the floor and thereby prevent or at least impede a displacement of the stand base and, in a released position, enable a displacement of the stand base,
wherein the braking system includes a first actuation element, actuatable by an operator for shifting the two braking feet from the released position into the braking position, wherein the first actuation element is coupled to the two braking feet in such a way that upon actuation of the first actuation element, the two braking feet are moved from the released position into the braking position,
wherein the stand base further comprises an immobilization device which holds the two braking feet in the braking position after actuation of the first actuation element, and wherein the braking system includes a second actuation element for releasing the immobilization device.

2. The stand base according to claim 1, wherein the first actuation element includes a pedal.

3. The stand base according to claim 1, wherein the first actuation element is connected via a bar system to the two braking feet.

4. The stand base according to claim 3, wherein the bar system includes a transverse bar at whose ends the two braking feet are articulatedly mounted; the bar system includes a tie bar that is articulatedly connected to the transverse bar and is connected to the first actuation element; and upon actuation of the first actuation element, the first actuation element moves the tie bar which in turn, via the transverse bar, moves the two braking feet from the released position into the braking position.

5. The stand base according to claim 1, wherein the two braking feet are each preloaded in the released position by an elastic element applying a spring force, and upon actuation of the first actuation element the two braking feet are moved into the braking position against the spring force.

6. The stand base according to claim 5, wherein upon actuation of the second actuation element to release the immobilization device the two braking feet are moved from the braking position into the released position by the spring force.

7. The stand base according to claim 1, wherein the immobilization device comprises a guidance unit for immobilization of the braking feet, wherein the guidance unit interacts in wedging fashion with a tie bar of the braking system.

8. The stand base according to claim 7, wherein the guidance unit interacts in wedging fashion with a tie bar of the braking system with the aid of a spring packet.

9. The stand base according to claim 1, wherein when the stand base is oriented as intended, the second actuation element is arranged above the first actuation element; and the second actuation element is shorter than the first actuation element.

10. The stand base according to claim 1, wherein the two braking feet are mounted, and are connected to one another and to the first actuation element, in such a way that an arrangement of the two braking feet relative to one another is modifiable.

11. The stand base according to claim 1, wherein the stand base body comprises multiple chambers each for selectable reception of at least one additional weight in order to balance the stand.

12. The stand base according to claim 11, wherein the braking system is embodied as a module; and said module is received in one of the chambers.

13. The stand base according to claim 11, wherein the stand base body comprises four identically shaped chambers, wherein two additional weights are receivable in each of the chambers.

14. The stand base according to claim 11, wherein fastening means are provided in the chambers for fastening the additional weights directly on the stand base body.

15. The stand base according to claim 14, wherein threads onto which the additional weights can be bolted with the aid of bolts are provided as the fastening means.

16. The stand base according to claim 1, wherein the rollers are double rollers.

17. A stand base for a surgical microscope stand, the stand base comprising:
a stand base body,
multiple rollers, fastened on the stand base body, for displaceably supporting the stand base on a floor, and
a braking system to prevent displacement of the stand base,
the braking system including at least two braking feet that, in a braking position, press against the floor and thereby prevent or at least impede a displacement of the stand base and, in a released position, enable a displacement of the stand base,
wherein the braking system includes a first actuation element, actuatable by an operator for shifting the two braking feet from the released position into the braking position, wherein the first actuation element is coupled to the two braking feet in such a way that upon actuation of the first actuation element, the two braking feet are moved from the released position into the braking position,
wherein the braking system includes a transverse bar to which the two braking feet are articulatedly mounted to permit rotation of the transverse bar relative to the two braking feet, the two braking feet are movable only along respective vertical axes, and the transverse bar is tiltable with respect to a horizontal orientation to position the two braking feet at different elevations while maintaining the two braking feet in a vertical orientation.

* * * * *